(12) United States Patent
Bulkowski et al.

(10) Patent No.: US 9,176,867 B2
(45) Date of Patent: Nov. 3, 2015

(54) HYBRID DRAM-SSD MEMORY SYSTEM FOR A DISTRIBUTED DATABASE NODE

(71) Applicants: Brian Bulkowski, menlo park, CA (US); Venkatachary Srinivasan, sunnyvale, CA (US)

(72) Inventors: Brian Bulkowski, menlo park, CA (US); Venkatachary Srinivasan, sunnyvale, CA (US)

(*) Notice: Subject to any disclaimer, the term of this patent is extended or adjusted under 35 U.S.C. 154(b) by 0 days.

(21) Appl. No.: 14/589,149

(22) Filed: Jan. 5, 2015

(65) Prior Publication Data

US 2015/0242311 A1 Aug. 27, 2015

Related U.S. Application Data

(63) Continuation-in-part of application No. 14/299,566, filed on Jun. 9, 2014, now Pat. No. 9,002,871, which is a continuation of application No. 13/451,551, filed on Apr. 20, 2012, now Pat. No. 8,799,248.

(60) Provisional application No. 61/478,940, filed on Apr. 26, 2011.

(51) Int. Cl.
*G06F 17/30* (2006.01)
*G06F 12/02* (2006.01)

(52) U.S. Cl.
CPC ...... *G06F 12/0246* (2013.01); *G06F 17/30861* (2013.01); *G06F 17/30336* (2013.01); *G06F 17/30339* (2013.01); *G06F 2212/7208* (2013.01)

(58) Field of Classification Search
CPC ............ G11C 11/005; G06F 17/30336; G06F 17/30339; G06F 17/30342
See application file for complete search history.

(56) References Cited

U.S. PATENT DOCUMENTS

| 8,111,559 B2 * | 2/2012 | Kwon et al. ............. 365/189.05 |
| 2011/0235260 A1 * | 9/2011 | Lee et al. ................. 361/679.32 |

OTHER PUBLICATIONS

Hitoshi Oi, "A Case Study: Performance Evaluation of a DRAM-Based Solid State Disk", Frontier of Computer Science and Technology, 2007, pp. 57-60.*

* cited by examiner

*Primary Examiner* — Cheryl Lewis (57) ABSTRACT

In one exemplary aspect, a method includes building a data index from a set of data from a client application in a distributed database system. The data index is optimized for operation in a DRAM data-storage device, and wherein the data index is built to use a set of fix-sized blocks that fit a DRAM device block size. The data index is maintained in the DRAM data-storage device. An SSD data-storage device is used to persistently store the data referenced by the data index in the DRAM data-storage device, and wherein the data and the metadata are stored in the SSD data-storage device in a log-based format.

20 Claims, 6 Drawing Sheets

FIGURE 6

HYBRID DRAM-SSD MEMORY SYSTEM FOR A DISTRIBUTED DATABASE NODE

CROSS-REFERENCE TO RELATED APPLICATIONS

This application is a claims priority to and is a continuation-in-part of U.S. patent application Ser. No. 14/299,566, titled METHOD AND SYSTEM OF MAPREDUCE IMPLEMENTATIONS ON INDEXED DATASETS IN A DISTRIBUTED DATABASE A ENVIRONMENT and filed on Jun. 9, 2014 now U.S. Pat. No. 9,002,871. U.S. patent application Ser. No. 14/299,566 in turn claims priority from and is a continuation in part of U.S. application Ser. No. 13/451,551, titled REAL-TIME TRANSACTION SCHEDULING IN A DISTRIBUTED DATABASE and filed Apr. 20, 2012 now U.S. Pat. No. 8,799,248. U.S. application Ser. No. 13/451,551 claims priority from U.S. Provisional Application No. 61/478,940, titled DISTRIBUTED DATABASE SYSTEM WITH A CLUSTER OF AUTONOMOUS NODES and filed Apr. 26, 2011. These applications are hereby incorporated by reference in their entirety.

BACKGROUND

1. Field

This application relates generally to data storage, and more specifically to a system, article of manufacture and method of optimizing an index for dynamic random access memory (DRAM) memory in a distributed database node.

2. Related Art

A distributed database can include a plurality of database nodes and associated data storage devices. A database node can manage a data storage device. If the database node goes offline, access to the data storage device can also go offline. Accordingly, redundancy of data can be maintained. However, maintaining data redundancy can have overhead costs and slow the speed of the database system. Additionally, offline data may need to be rebuilt (e.g. after the failure of the database node and subsequent rebalancing operations). This process can also incur a time and processing cost for the database system. Therefore, methods and systems of self-managing nodes of a distributed database cluster with a consensus algorithms can provide improvements to the management of distributed databases.

BRIEF SUMMARY OF THE INVENTION

In one aspect, a method includes building a data index from a set of data from a client application in a distributed database system. The data index is optimized for operation in a DRAM data-storage device, and wherein the data index is built to use a set of fix-sized blocks that fit a DRAM device block size. The data index is maintained in the DRAM data-storage device. An SSD data-storage device is used to persistently store the data referenced by the data index in the DRAM data-storage device, and wherein the data and the metadata are stored in the SSD data-storage device in a log-based format.

Optionally, the log-based format creates a copy of the data for each write operation to the SSD data-storage device. The distributed database system can be a Not Only Structured Query Language (NoSQL) distributed database system. The SSD data-storage device can comprise an array of can have an array of flash-based memory devices, and wherein data is fetched in parallel from the flash-based memory devices and shipped back to the client application.

BRIEF DESCRIPTION OF THE DRAWINGS

The present application can be best understood by reference to the following description taken in conjunction with the accompanying figures, in which like parts may be referred to by like numerals.

The Figures described above are a representative set, and are not an exhaustive with respect to embodying the invention.

DETAILED DESCRIPTION

Disclosed are a system, method, and article of manufacture for hybrid DRAM-SSD memory system for a distributed database node. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

A. Environment and Architecture

Figure 1:
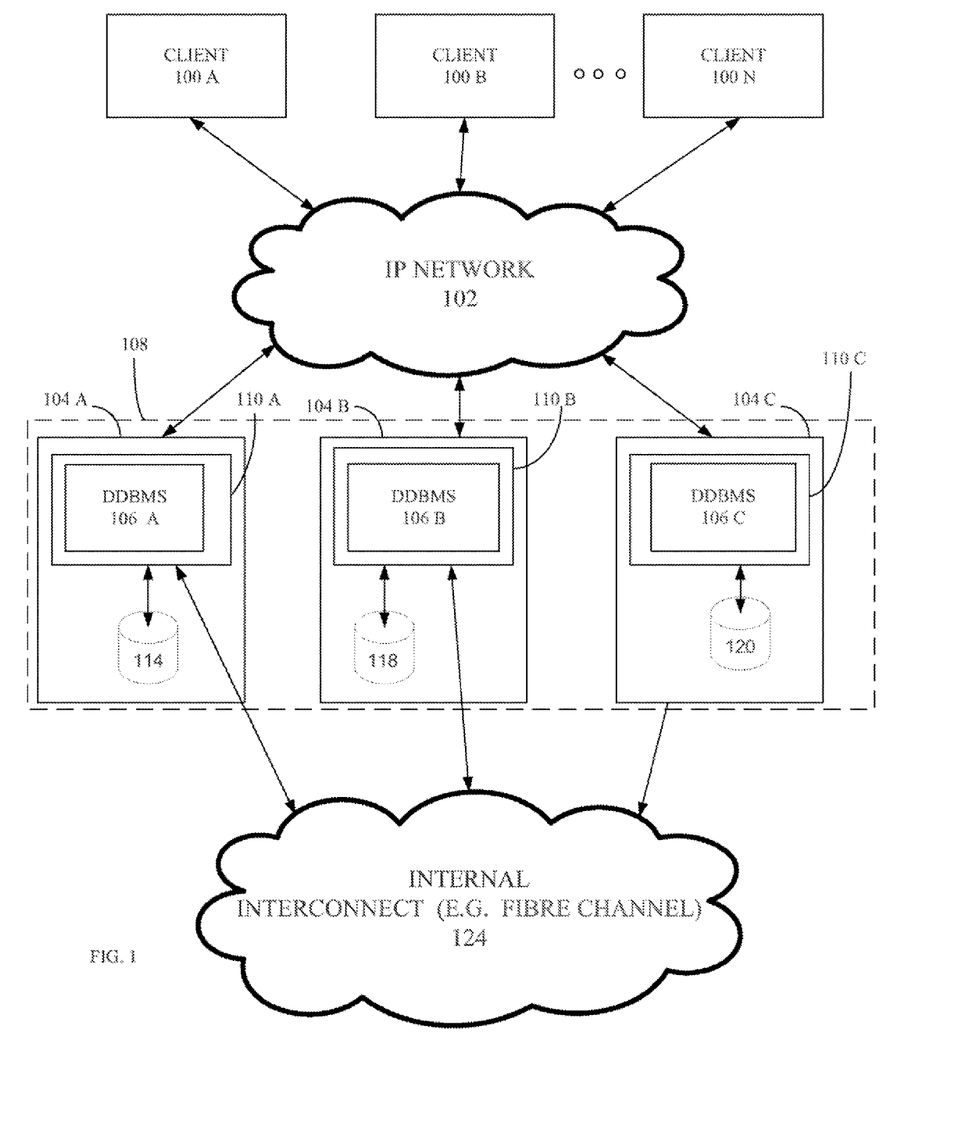
FIG. 1 shows, in a block diagram format, a distributed database system operating in a computer network according to an example embodiment, according to some embodiments.

Disclosed are a system, method, and article of manufacture of a distributed database system. FIG. 1 shows, in a block diagram format, a distributed database system (DDBS) operating in a computer network according to an example embodiment, according to some embodiments. A DDBS can typically be a collection of databases that can be stored at different computer network sites. Each database may involve different database management systems and different architectures that distribute the execution of transactions. A DDBS can be managed in such a way that it appears to the user as a centralized database.

FIG. 1 shows database nodes 104 A-C (hereafter 'nodes') that collectively represent a cluster of computers 108 and associated databases (hereafter 'cluster') usable by a DDBS. The processing and data storage of the DDBS can be partitioned into nodes 104 A-C. The term "cluster" refers to a collection of one or more networked database nodes that function as a single system. In one example embodiment, cluster 108 can be designed without a node master and without database sharding. Database sharding typically involves a method of horizontal partitioning in a database or search engine. The architecture of cluster 108 can establish node equality and use uniform data distribution across cluster 108. Cluster 108 can also utilize a per node structure in order to provide continuity of processing client data transactions in the event of a single point of failure within the cluster. Additionally, cluster 108 can use a data rebalancing mechanism that can evenly distribute query volume across all nodes in a manner that rebalancing does not generally affect the behavior of cluster 108. Cluster 108 can also automatically handle network-partitioning events. These operations are discussed in further detail below.

In a particular example embodiment, cluster 108 can be implemented with a shared-nothing architecture. A shared-nothing architecture is typically characterized by data partitioning and no sharing between the machine components in a cluster of computers, except where communication between partitions is carried out. The database task carried out by the cluster is subdivided and each machine carries out processing steps using its own resources to complete its subdivided portion or portions of the task. Such a cluster architecture can scale for database workloads and have a limited need for intracluster communication.

Nodes 104 A-C can communicate to clients 100 A-N via IP network 102. Internet-protocol (IP) network 102 can utilize a set of communications protocols used for the Internet and other similar networks. In some embodiments, IP network 102 may also include other means of data communication such as a local area network (LAN) that utilizes IEEE 802-type protocols, a telecommunications data network, or any combination thereof. Clients 100 A-N can be any application or process that communicates with nodes 104 A-C via IP network 102.

Nodes 104 A-C can include one or more central processing units (CPU), memory resources and permanent data storage systems. Database nodes 104 A-C can include distributed database management system (DDBMS) 106 A-C. DDBMS 106 A-C can include a set of computer programs that controls the creation, maintenance, and the use of distributed database of cluster 108. DDBMS 106 A-C manages the various data storage systems 114, 118 and 120 that comprise the distributed database as well as the data objects on the data storage systems. The particular example embodiment of FIG. 1 shows DDBMS 106 A-C as a distributed database manager layer. The DDBMS 106 A-C can include components that are able to execute database tasks on their respective servers 110 A-C, as well as to carry out functions (described below) that relate to the operation of the DDBS in cluster 108.

At the application layer of the database nodes 104 A-C can manage the processing of data transactions. For the sake of simplicity, not all the components of nodes 104 A-C are shown. However, it will be appreciated that nodes 104 A-C can include other components. For example, DDBMS 106 A-C can include systems as lock managers, schedulers, meta-data managers, policy managers and the like. In some embodiments, nodes 104 A-C can be self-managing nodes that can reconfigure the cluster and repartition data within the cluster without a central administrative entity such as a database administrator (DBA). A lock manager can implement pooling of a lock pool instead of a lock per data object process.

Nodes 104 A-C can be linked together via an internal cluster interconnect 124 such as a Fibre Channel network. Fibre Channel protocols can use a transport protocol (similar to TCP used in IP networks) which predominantly transport small computer system interface (SCSI) commands over a Fibre Channel network. SCSI commands are typical a set of standards for physically connecting and transferring data between computers and peripheral devices. In other embodiments, internal cluster interconnect 124 can use internet small computer system interface (iSCSI) protocols as well. iSCSI can carry SCSI commands over (and thus link nodes 104 A-C via) an IP network.

A database transaction can comprise a unit of work performed within the data storage system (or similar system) against a database, and is treated in a coherent and reliable way generally discreet of other data transactions. Generally, a database transaction has four properties that lead to the consistency and reliability of a distributed database. These are Atomicity, Consistency, Isolation, and Durability.

Atomicity. A transaction is treated as a unit of operation. For example, in the case of a crash, the system should complete the remainder of the transaction, or it will undo all the actions pertaining to this transaction. Should a transaction fail, changes that were made to the database by it are undone (i.e. rollback).

Consistency. This property deals with maintaining consistent data in a database system. A transaction can transform the database from one consistent state to another. Consistency falls under the subject of concurrency control.

Isolation. Each transaction should carry out its work independently of any other transaction that may occur at the same time.

Durability. This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

Additionally, nodes 104 A-C can also include of one or more data storage devices 114, 118 and 120 (e.g. a dynamic random-access memory (DRAM), rotating hard disk, solid-state drive (SSD), or any combination thereof) or file systems. Each data storage device 114, 118 and 120 can have a set of metadata that uniquely identifies the data its stores and the data attributes (e.g. time stamps and the like) to the DDBMS that manages the particular storage device.

An SSD device can be a data storage device that uses solid-state memory to store persistent data with the intention of providing access in the same manner of a block input/output hard disk drive. DRAM can be a type of random-access memory that stores each bit of data in a separate capacitor within an integrated circuit. The capacitor can be either charged or discharged; these two states are taken to represent the two values of a bit (0 and 1). A hard-disk drive can be a non-volatile magnetic data storage device in which data are digitally recorded by various electronic, magnetic, optical, or mechanical methods on a surface layer deposited of one or more planar, round and rotating platters.

Figure 2:
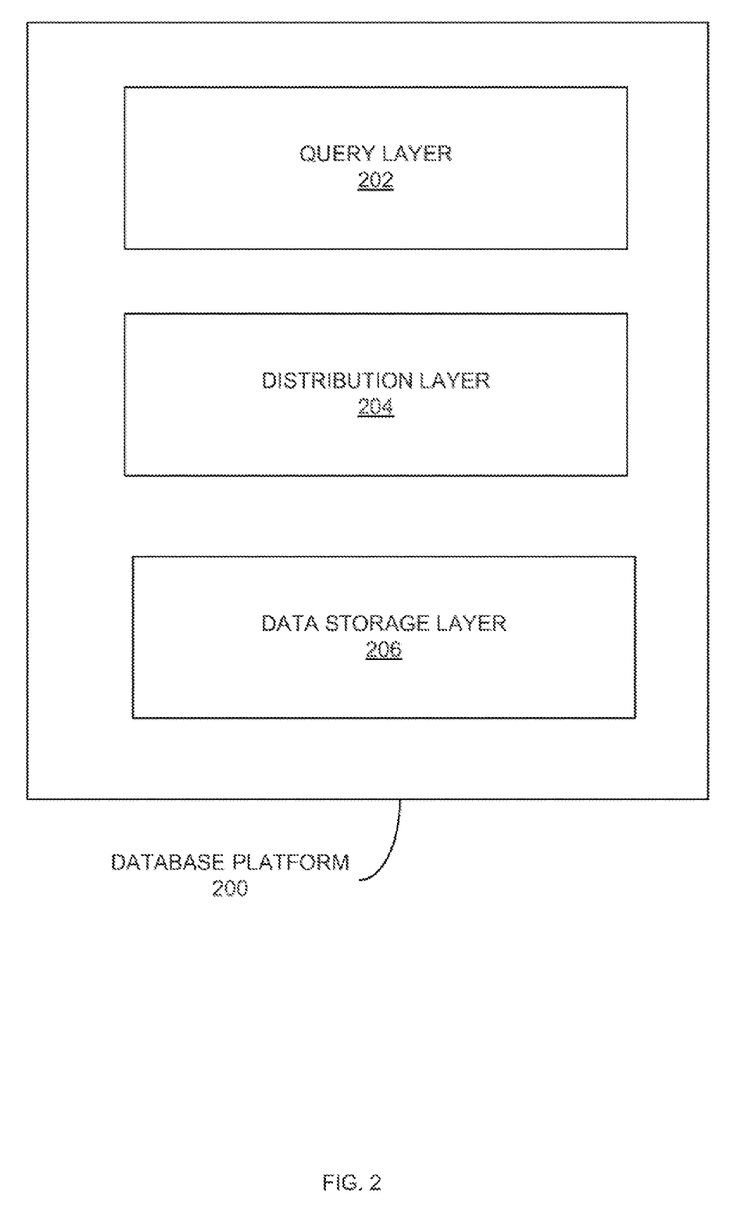
FIG. 2 depicts a block diagram of an exemplary database platform that can be implemented in a DDS such as the system of FIG. 1, according to some embodiments.

FIG. 2 depicts a block diagram of an exemplary database platform that can be implemented in a DDS such as the system of FIG. 1, according to some embodiments. Database platform 200 includes both hardware architecture and software frameworks that allow the database systems, such as the software functionalities of the query layer 202, the distribution layer 204 and the data storage layer 206, to operate.

The query layer 202 can include the client libraries and the query mechanisms. Client libraries can include smart client libraries, including libraries in the PHP Java, C#, C, C libevent, Python and Ruby on Rails languages. Query layer 202 can include systems and functionalities that support various query types from clients 100 A-N. Query layer 202 can handle client communications in various protocol formats such as an ASCII-based control protocol. This protocol can govern the client's server discovery process and the client server handshake. Query layer 202 can be optimized for key-value queries as well as other query types. Additional information regarding the query layer 202 is provided below in the description of FIG. 4.

Distribution layer 204 can include systems and functionalities that implement and manage a distributed node cluster architecture (such as those described above with regards to the system of FIG. 1) that can combine distributed transactions with server distribution. Distribution layer 204 can implement such operations as inter-cluster communication, cluster-consensus voting operations, namespace distribution, distributed transaction management, replication operations and maintenance operations.

Data storage layer 206 can include systems and functionalities that support a variety of data models according to the various embodiments. In one example embodiment, the data storage layer 206 can include three functional units (not shown). In this example embodiment, the data model can provide application semantics that include named columns and typed values. A primary key index can be used to perform data lookup, data retrieval and data iteration operations. The systems and functionalities of the data storage layer 206 can also utilize various data storage systems, including DRAM, rotational disk, flash storage, or any combination thereof (e.g. data on rotational disk using available DRAM as a cache). Flash storage can be implemented with an SSD device. Furthermore, in this example embodiment, the data storage layer 206 can implement a schema-free data model that supports the standard read/write operations and additionally supports the ability to increment values within the distributed database. The data storage layer 206 can additionally implement indexes that are stored in DRAM.

Data storage layer 206 can spread the contents of each namespace across every node in a cluster. This virtual partitioning can be automatic and transparent to a client. If a node receives a request for a piece of data it does not have locally, the node can then satisfy the request by creating an internal proxy for this request. The node can then fetch the data from the real owner node and then subsequently reply to the client directly. It should be noted that other aspects of database platform 200 (e.g. a data transport layer) have not been shown for the sake of simplicity.

Figure 3:
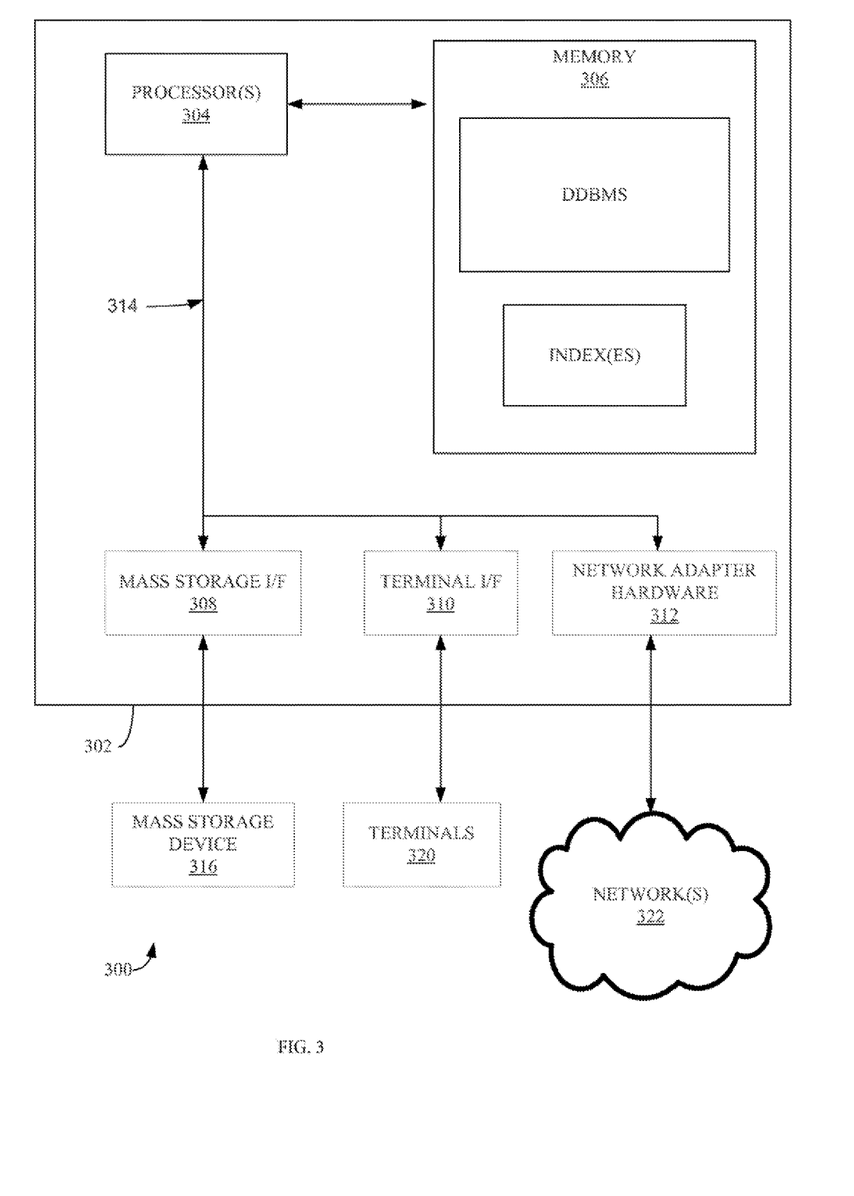
FIG. 3 depicts an exemplary computing system configured to perform any one of the processes described herein, according to some embodiments.

FIG. 3 depicts an exemplary computing system 300 configured to perform any one of the processes described herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 is a block diagram illustrating a computing system 300, according to some embodiments. The computing system 300 is based upon a suitably configured processing system adapted to implement one or more exemplary embodiments. Any suitably configured processing system can similarly be used as the computing system 300 by embodiments such as servers 110 A-C residing in cluster 108 of FIG. 1, a personal computer, workstation, a distributed database server, or the like. The computing system 300 includes a computer 302. The computer 302 has a processor(s) 304 that is connected to a memory 306, mass storage interface 308, terminal interface 310, and network adapter hardware 312. A system bus 314 interconnects these system components. The mass storage interface 308 is used to connect mass storage devices, such as data storage device 316 (e.g. data storage systems 114, 118 and 120 and data storage 708 described infra), to the computer 302. Examples of data storage 316 can include those examples discussed supra (rotating hard disk systems, SSD flash systems, DRAM, and the like), as well others such as optical drives. Data storage 316 may be used to store data to and read data from a computer-readable medium or storage product.

Memory 306, in one embodiment, includes a DDBMS, such as DDBMS 106 A-C. In some example embodiments, memory 306 can also include one or more indexes. Although illustrated as concurrently resident in the memory 306, it is clear that respective components of the memory 306 are not required to be completely resident in the memory 306 at all times or even at the same time. In one embodiment, the computer 302 utilizes conventional virtual addressing mechanisms to allow programs to behave as if they have access to a large, single storage entity, referred to herein as a computer system memory, instead of access to multiple, smaller storage entities such as the memory 306 and data storage device 316. In some embodiments, additional memory devices (such as a DRAM cache) can be coupled with computer 302 as well.

Although only one CPU 304 is illustrated for computer 302, computer systems with multiple CPUs can be used equally effectively. Some embodiments can further incorporate interfaces that each includes separate, fully programmed microprocessors that are used to off-load processing from the CPU 304. Terminal interface 310 is used to directly connect one or more terminals 320 to computer 302 to provide a user interface to the computer 302. These terminals 320, which are able to be non-intelligent or fully programmable workstations, are used to allow system administrators and users to communicate with computer 302. The terminal 320 can also include other user interface and peripheral devices that are connected to computer 302 and controlled by terminal interface hardware included in the terminal I/F 310 that includes video adapters and interfaces for keyboards, pointing devices, and the like.

An operating system (not shown) included in the memory is a suitable multitasking operating system such as the Linux, UNIX, Windows XP, and Windows Server operating system. Embodiments are able to use any other suitable operating system. Some embodiments utilize architectures, such as an object oriented framework mechanism, that allows instructions of the components of operating system to be executed on any processor located within computer 302. The network adapter hardware 312 is used to provide an interface to a network 322. Some embodiments are able to be adapted to work with any data communications connections including present day analog and/or digital techniques or via a future networking mechanism.

Although the exemplary embodiments are described in the context of a fully functional computer system, those skilled in the art will appreciate that embodiments are capable of being distributed as a program product via CD or DVD, e.g., a CD ROM, or other form of recordable media, or via any type of electronic transmission mechanism. At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, and Java) or some specialized application-specific language.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

B. Operation

Figure 4:
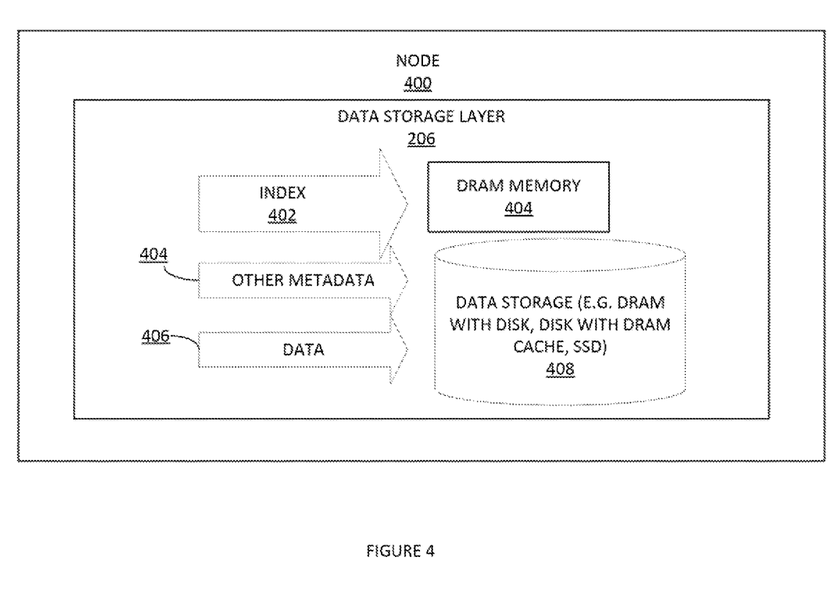
FIG. 4 depicts a block diagram of an example embodiment of certain components of the data storage layer of FIG. 2 of a distributed database node, according to some embodiments.

FIG. 4 depicts a block diagram of an example embodiment of certain components of the data storage layer 206 of FIG. 2 of a distributed database node 400, according to some embodiments. According to the example embodiment, the data storage layer 206 can include a DRAM device 404 used as non-persistent memory and a data storage device 408 such as a rotating hard disk, a combination DRAM with rotating hard disk system, a rotating hard disk with a DRAM cache system and/or a SSD device (e.g. a NAND-based flash memory or other flash memory) used as persistent memory. FIG. 4 also depicts an index 402 built from data 406 (and in some embodiments metadata 408) located in data storage device 408. Index 402 can be specially optimized for efficient operation with the context of DRAM device 404. For example, index 402 can be built to use a fix-sized blocks that fit with the memory of DRAM device 404. Other example optimization techniques include, but are not limited to, using crypto-digest keys (e.g. (e.g. cryptographic hash function) to build index 402 (such that the keys are not variable in size), pointer compression techniques (e.g. Transparent Pointer Compression) to decrease the size of pointer (e.g. representation of pointer that can be mathematically changed), replacement of pointers with referred data, arena allocation techniques (e.g. region-based memory management techniques), red-black (RB) tree indexing, pooling of the lock pool (instead of a lock per data object), mutual exclusion (i.e. mutex) algorithms, and the like. An RB tree can be a type of self-balancing binary tree used to organize pieces of comparable data. Furthermore, data and metadata (data about when data written, timestamps, etc.) can be laid on in the data storage device 408 in log-based format.

A cryptographic hash function can be designed to take a string of any length as input and produce a fixed-length hash value. A cryptographic hash function can have the following properties, inter alia: pre-image resistance, second pre-image resistance, and/or collision resistance. A pointer can be a data object whose value refers directly to (or "points to") another value stored elsewhere in the computer memory using its address. An example of a region-based memory management technique is now provided. Each region can be implemented as a linked list of large blocks of memory. Each block can be large enough to serve many allocations. The current block can maintain a pointer (e.g. a compressed pointer) to the next free position in the block, and if the block is filled, a new one is allocated and added to the list. When the region is deallocated, the next-free-position pointer is reset to the beginning of the first block, and the list of blocks can be reused for the next region to be created. Alternatively, when a region is deallocated, the list of blocks can be appended to a global free list from which other regions may later allocate new blocks.

Figure 5:
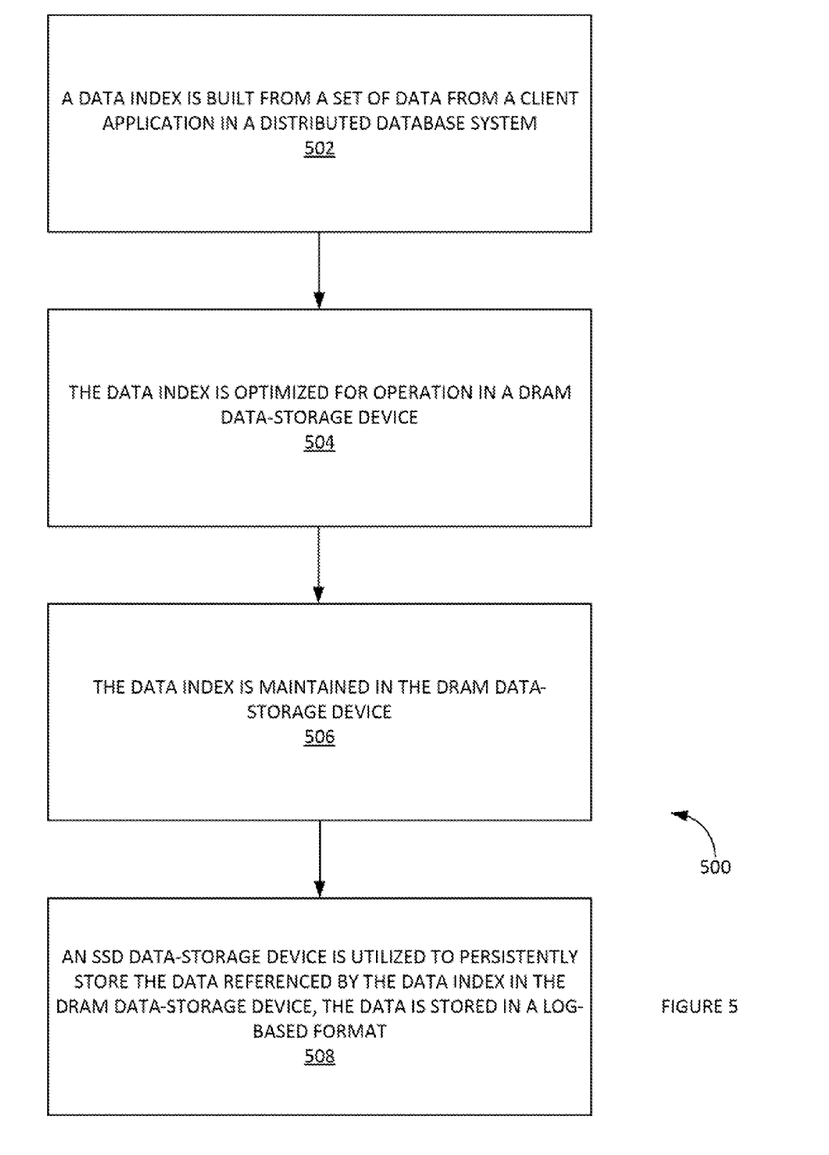
FIG. 5 illustrates an exemplary process of creating an optimized database index in a DRAM device of a distributed database node, according to some embodiments.

FIG. 5 illustrates an exemplary process of hybrid DRAM-SSD memory system for a distributed database node such as those provided in FIG. 1. Generally, the index can be a data structure that facilitates access to the rows in a table of data located in a data storage device. Using the systems and devices of FIG. 4 and FIG. 6 (infra) as an example, in step 502, a data index is built from a set of data from a client application in a distributed database system. In step 504, the data index is optimized for operation in a DRAM data-storage device. For example, the data index can be built to use a set of fix-sized blocks that fit a DRAM device block size. In step 506, the data index is maintained in the DRAM data-storage device. In step 508, an SSD data-storage device is utilized to persistently store the data referenced by the data index in the DRAM data-storage device. The log-based format can include writing the data and metadata sequentially to a circular buffer (e.g. a log). The data and the metadata are stored in the SSD data-storage device in a log-based format. The systems and operations discussed in FIGS. 1-3, 4 and 6 can be utilized to perform steps 502-508.

Figure 6:
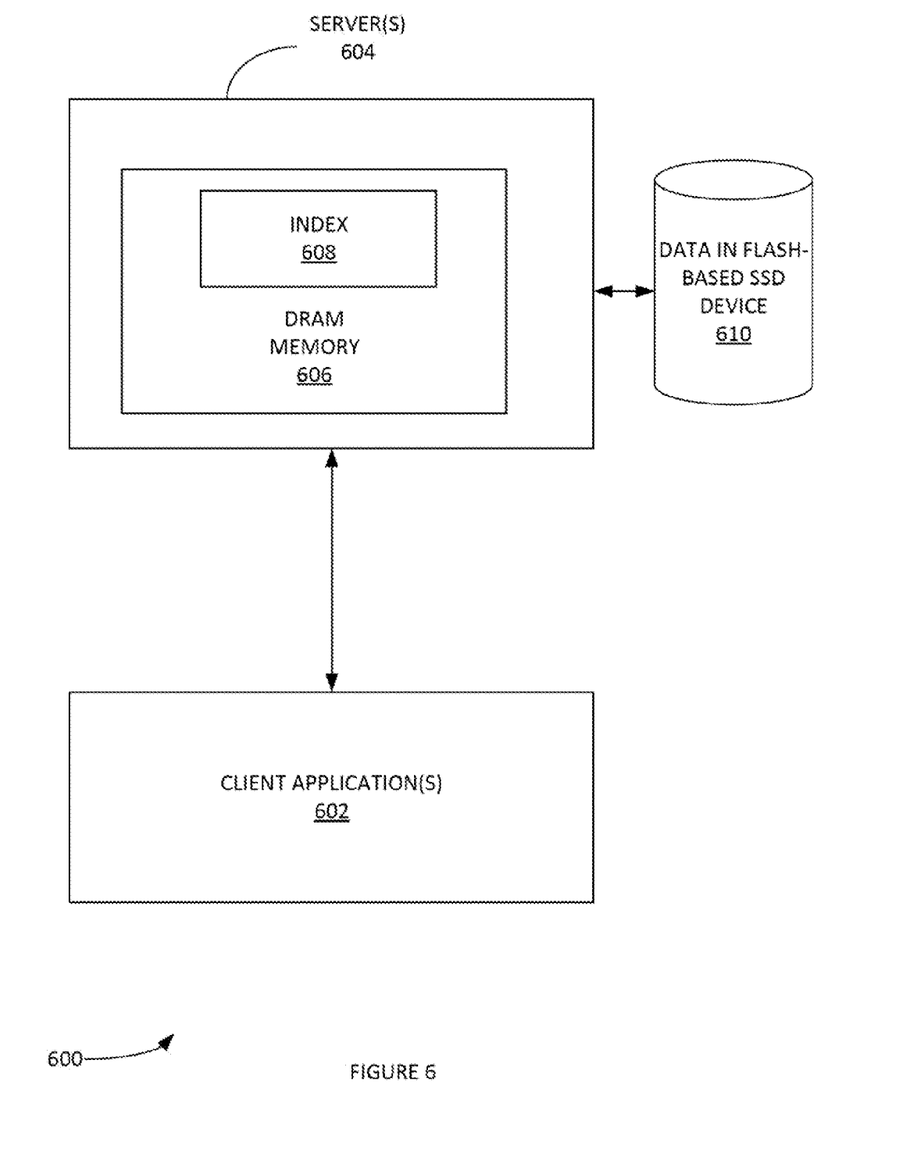
FIG. 6 illustrates, in block diagram format, a system that implements process 500, according to some embodiments.

FIG. 6 illustrates, in block diagram format, a system 600 that implements process 500, according to some embodiments. System 600 can extends 'in memory' to a hybrid model of index in a DRAM system and data on flash-based SSD data storage device. System 600 can include client applications 602. Client applications 602 can utilize a No-SQL distributed database system that includes servers 604. Servers 604 can include DRAM memory 606. DRAM memory 606 can include a data index that is built from data from a client application in a distributed database system. The data index 608 can be optimized for operation in a DRAM data-storage device. The data referenced by the data index 608 can be stored in flash-based SSD device(s) 610. The data index 608 can be built to use a set of fix-sized blocks that fit a DRAM device block size. Client applications 602 can cause data to be stored in flash-based SSD device(s) 610 (and/or other type of SSD data-storage device(s)). In one example, an array of flash-based SSD device(s) 610 can be provided and parallelism operations (e.g. task parallelism, distributing the data across different parallel computing nodes, etc.) can be implemented by server(s) 604. In some examples, the log-based format means that when a write data operation to a lash-based SSD device(s) 610 occurs, ten every new copy is written to the same place. The file system managed can be managed like a log such that it writes in large blocks to the end of the log. Data defragmentation operations can also be performed in the back ground. Writes can be batched into large continuous blocks as well. The log-based format further means that wear-levelling can also be reduced in some examples as well.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States:

1. A method of a hybrid dynamic random access memory (DRAM)-solid-state drive (SSD) memory system in a distributed database system comprising:
   building a data index from a set of data from a client application in a distributed database system;
   optimizing the data index for operation in a DRAM data-storage device, and wherein the data index is built to use a set of fix-sized blocks that fit a DRAM device block size;
   maintaining the data index in the DRAM data-storage device; and
   utilizing an SSD data-storage device to persistently store the data referenced by the data index in the DRAM data-storage device, and wherein the data and the metadata are stored in the SSD data-storage device in a log-based format.

2. The method of claim 1, wherein the log-based format creates a copy of the data for each write operation to the SSD data-storage device.

3. The method of claim 2, wherein the SSD data-storage device can comprise an array of can have an array of flash-based memory devices, and wherein data is fetched in parallel from the flash-based memory devices and shipped back to the client application.

4. The method of claim 2, wherein the data and the metadata are written sequentially to a circular buffer in the log-based format.

5. The method of claim 4, wherein the distributed database system comprises a Not Only Structured Query Language (NoSQL) distributed database system.

6. The method of claim 1, wherein a cryptographic hash function is used to build the data index.

7. The method of claim 1, wherein an array of SSD data-storage devices are used to persistently store the data referenced by the data index in the DRAM data-storage device.

8. The method of claim 7, wherein the SSD data-storage device comprises a NAND (Not AND)-based flash memory device.

9. The method of claim 1, wherein the data index is implemented as a red-black tree data index.

10. The method of claim 1, wherein the data index is implemented using at least one arena allocation process.

11. A computerized system of a hybrid dynamic random access memory (DRAM)-solid-state drive (SSD) memory system in a distributed database system comprising:
    a processor configured to execute instructions;
    a memory including instructions when executed on the processor, causes the processor to perform operations that:
       build a data index from a set of data from a client application in a distributed database system;
       optimize the data index for operation in a DRAM data-storage device, and wherein the data index is built to use a set of fix-sized blocks that fit a DRAM device block size;
       maintain the data index in the DRAM data-storage device; and
       utilize an SSD data-storage device to persistently store the data referenced by the data index in the DRAM data-storage device, and wherein the data and the metadata are stored in the SSD data-storage device in a log-based format.

12. The computerized system of claim 11, wherein the log-based format creates a copy of the data for each write operation to the SSD data-storage device.

13. The computerized system of claim 12, wherein a cryptographic hash function is used to build the data index.

14. The computerized system of claim 12, wherein an array of SSD data-storage devices are used to persistently store the data referenced by the data index in the DRAM data-storage device.

15. The computerized system of claim 12, wherein the SSD data-storage device comprises a NAND (Not AND)-based flash memory device.

16. The computerized system of claim 12, wherein the data index is implemented as a red-black tree data index.

17. The computerized system of claim 12, wherein the data index is implemented using at least one arena allocation process.

18. The computerized system of claim 12, wherein the SSD data-storage device can comprise an array of can have an array of flash-based memory devices, and wherein data is fetched in parallel from the flash-based memory devices and shipped back to the client application.

19. The computerized system of claim 12, wherein the data and the metadata are written sequentially to a circular buffer in the log-based format.

20. The computerized system of claim 12, wherein the distributed database system comprises a Not Only Structured Query Language (NoSQL) distributed database system.

* * * * *